Dec. 4, 1923.

F. R. McGEE

THRUST BEARING

Filed Sept. 28, 1922

Witnesses:
Edwin Trueb

Inventor:
FRANK R. McGEE
by D. Anthony Usina
his Attorney.

Dec. 4, 1923.
F. R. McGEE
THRUST BEARING
Filed Sept. 28, 1922
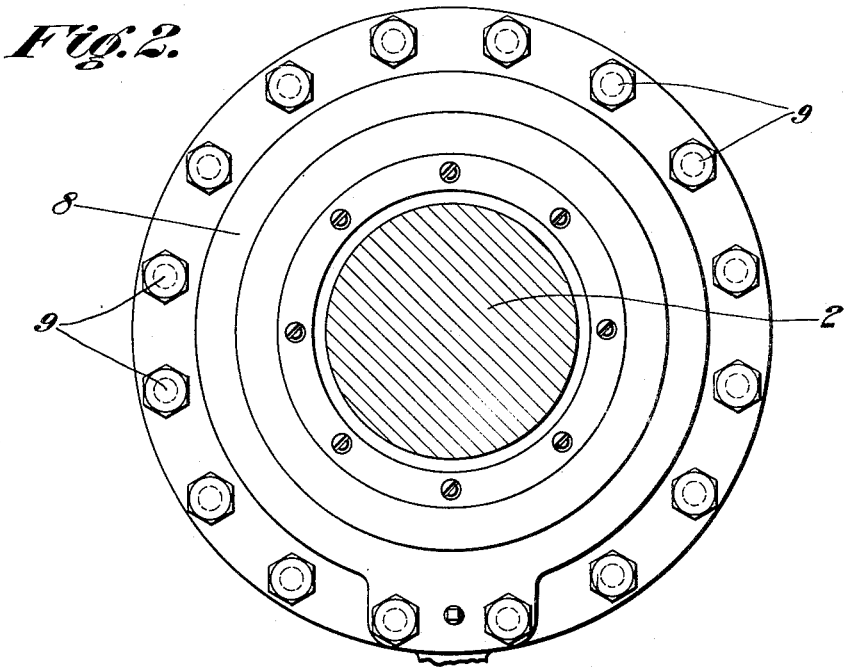
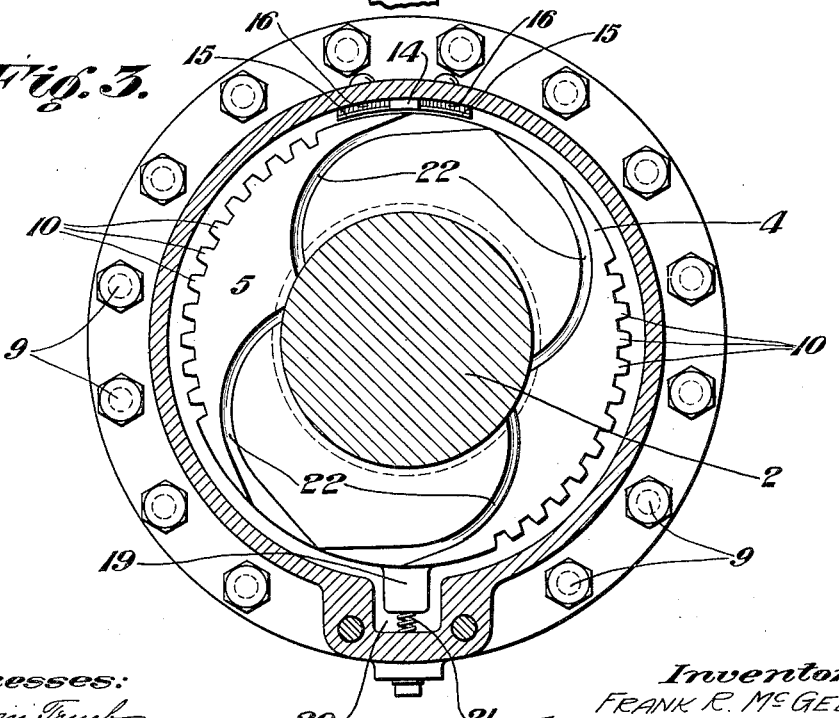

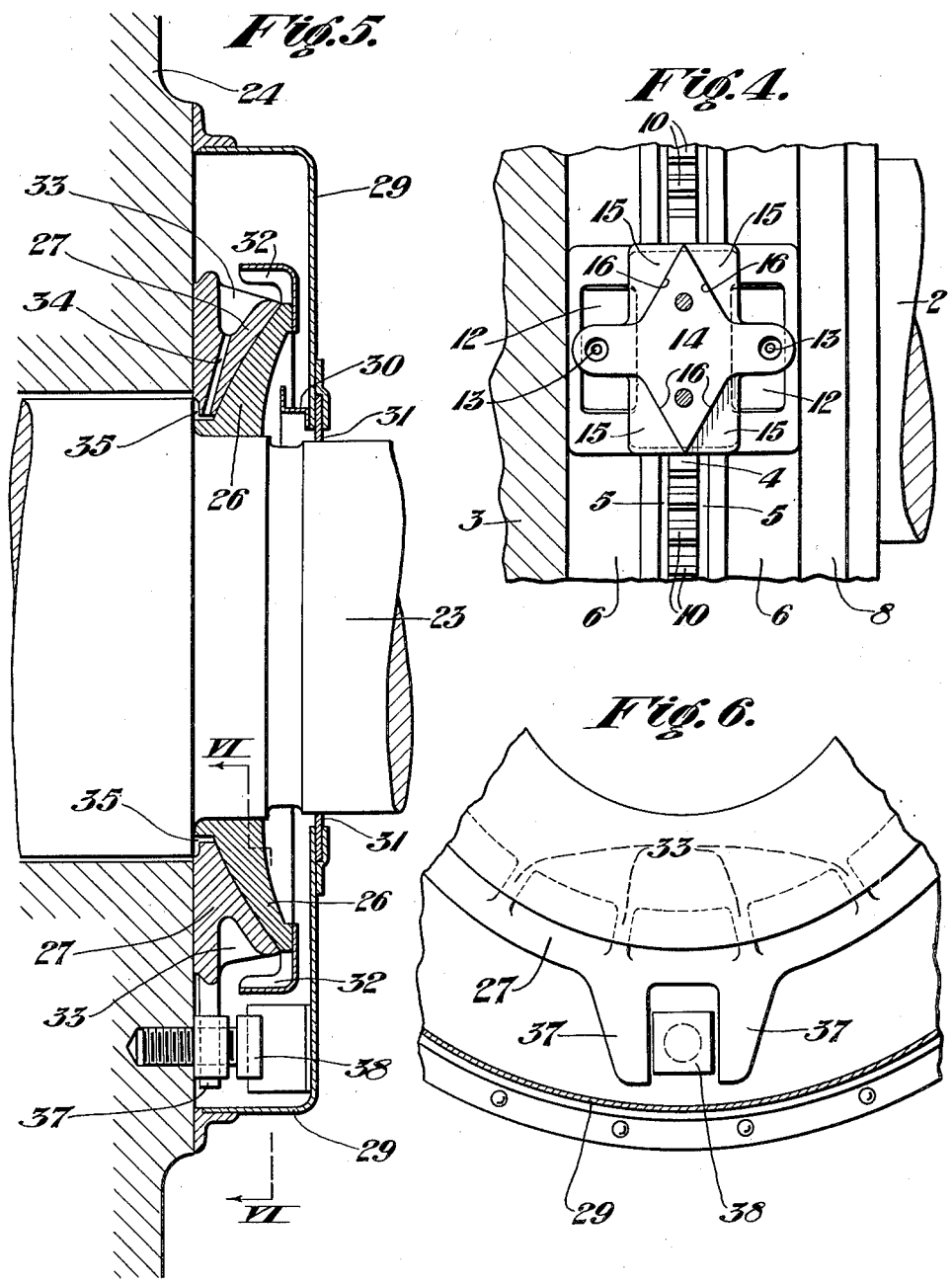

Patented Dec. 4, 1923.

1,476,345

UNITED STATES PATENT OFFICE.

FRANK R. McGEE, OF STEUBENVILLE, OHIO.

THRUST BEARING.

Application filed September 28, 1922. Serial No. 591,108.

*To all whom it may concern:*

Be it known that I, FRANK R. McGEE, a citizen of the United States, and resident of Steubenville, in the county of Jefferson and State of Ohio, have invented certain new and useful Improvements in Thrust Bearings, of which the following is a specification.

This invention relates to thrust bearings and more particularly to thrust bearings designed for use on low speed, heavy duty shafts, such as rolling mill drive shafts.

One object of this invention is to provide a bearing of this class that will have a novel arrangement of parts so designed as to cause a novel and improved oil circulation through-out the bearing.

Another object is to provide a thrust bearing in which the parts are self alining, and of such rigidity that the thrust load will be evenly distributed to the main bearing.

The above and other objects and advantages will be more fully brought out in the following specification and illustrated in the accompanying drawings.

In the drawings, Figure 1 is a sectional side elevation of a drive shaft and main pedestal bearing having this invention applied thereto.

Figure 2 is an end elevation of the thrust bearing.

Figure 3 is a sectional end elevation of the thrust bearing, the end of the casing, and outer washer being removed.

Figure 4 is a detailed plan view of the upper portion of the bearing with the casing removed, showing the oil deflecting plate.

Figure 5 is a sectional side elevation of a drive shaft and main bearing, having a modified form of thrust bearing embodying this invention applied thereto for taking thrust loads in one direction only.

Figure 6 is a fragmentary detail on the line VI—VI of Figure 5.

Figure 1:
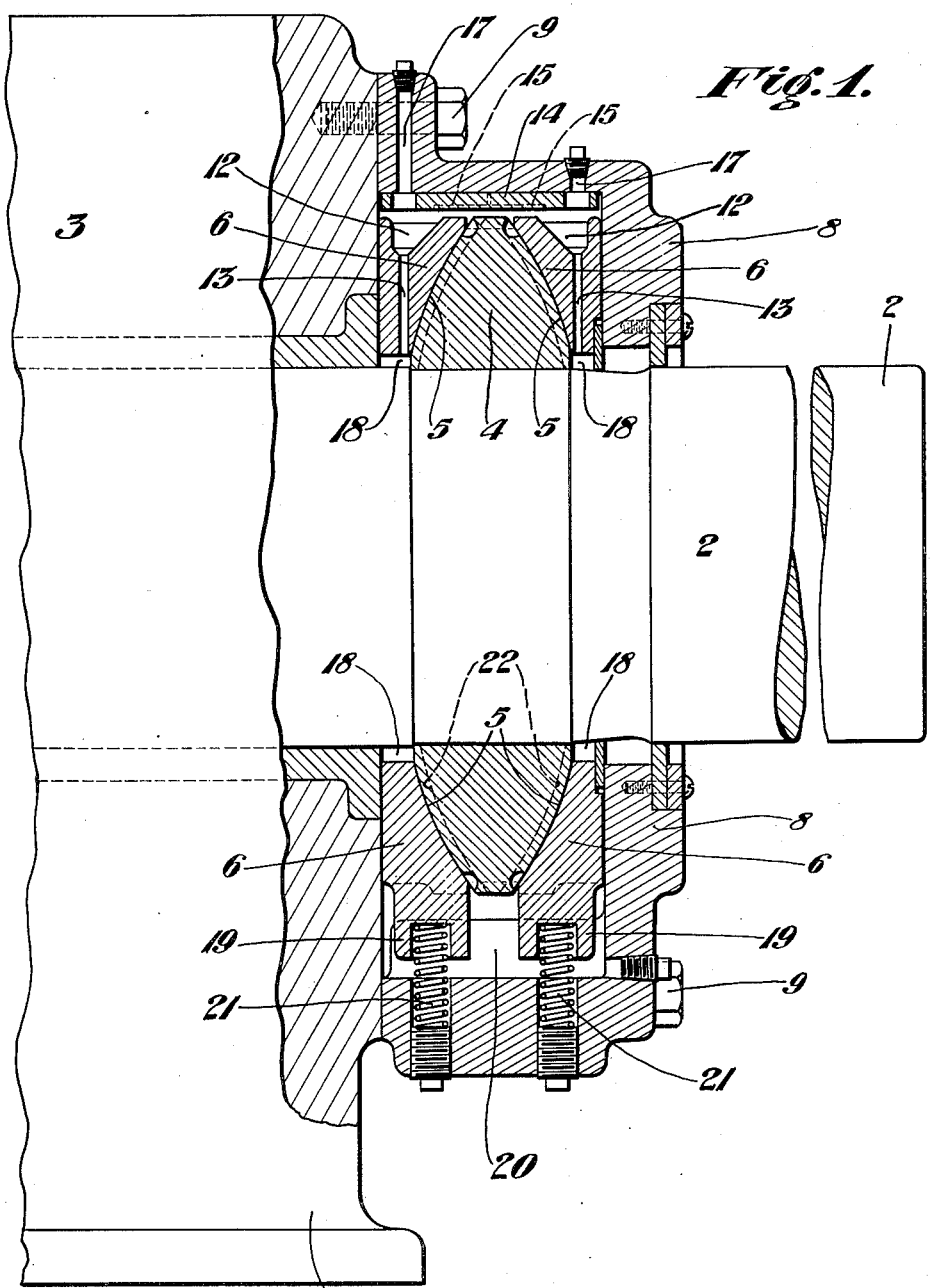

Referring more particularly to the drawings, the numeral 2 designates a main drive shaft journaled in a pedestal bearing 3 of any well known construction. A thrust collar 4 is rigidly secured on or preferably formed integral with the shaft 2 and is provided with slightly convexly curved side bearing faces 5.

Thrust from the collar 4 is taken up by the stationary thrust pressure equalizing washers 6 mounted on each side of the collar 4 and having concavely curved bearing faces fitted over the convex bearing faces 5 of the collar 4. The one washer 6 has its rear face bearing against the bearing 3 and the other washer has its rear face bearing against an enclosing and supporting casing 8 secured to the main bearing by stud bolts 9 and enclosing the parts of the thrust bearing.

The collar 4 is provided with oil throwing teeth or lugs 10 around its periphery adapted to throw oil up over the bearing parts. The upper portion of each washer 6 is provided with oil catching pockets 12 which are in turn provided with oil ducts 13 extending through the washers to the shaft 2.

An oil deflecting plate 14 is secured to the casing 8 immediately above the pockets 12, and comprising oil receiving shelves 15 and deflecting portions 16 which deflect the oil into the pockets 12.

The casing 8 is provided with oil holes 17 through which oil may be inserted for the bearing.

The washers 6 are fitted loosely on the shaft 2 so as to form an oil space 18.

The washers 6 are held against rotation by lugs 19 which fit loosely in a recess 20 in the casing 8 and are supported by springs 21 so as to resiliently engage or seat against the collar 4 and prevent uneven wear. It will thus be seen that the slight play allowed the washers 6 permits them to find their own seat on the collar 4.

The collar 4 is provided with two pairs of tangential oil grooves 22 on each side face extending from the outer edge or rim inwardly to the shaft 2. The outer end of the grooves 22 are flared and are on a tangential angle to the rim, so as to provide for a scoop-like action to pick up the oil and force it in across the face of the collar and between the washers and collar, when operating in either forward or reverse directions.

In Figure 5 a slightly modified form of thrust bearing is shown, which is primarily designed for use in taking the thrust to one direction only. In this construction a shaft 23 is shown journaled in a main bearing 24. A thrust collar 26 is mounted rigidly on the shaft 23 and a thrust pressure equalizing washer 27 is mounted on the shaft between the bearing 24 and collar 26. The collar 26 has a convex bearing face and the washer 27 is provided with a concave bearing face fitted over the convex face of said collar. The thrust bearing is enclosed in an oil and dust guard casing 29 carrying an oil collecting trough 30 and an oil retaining seal 31. Oil throwing or splashing projections or lugs 32 are secured to the thrust collar 26 and these with stiffening webs 33 and oil circulation grooves 34 and oil reservoir space 35 provide a thorough oil distribution and lubrication system for the bearing. Thrust pressure equalizing washer 27 is prevented from rotating by lugs 37 and stop 38, but is free to seek its own center due to the clearance between lugs 37 and stop 38 and clearance at the oil reservoir space 35.

The operation of the above described bearings will be readily understood. The washers, due to their loose mounting on the drive shaft, will readily find their seats on the thrust collar. The oil splashing lugs will insure a distribution of oil over the bearing at all times, and in the bearing of Figures 1 to 4 the oil grooves 22 will cause a forced circulation of oil between washers and collar.

I claim:—

1. A thrust bearing comprising the combination with a shaft, of a thrust collar rigid on said shaft, said collar having a convex side face, a washer mounted on said shaft and having a concave face fitted over the convex side face of said collar, said washer being locked against rotation, oil throwing lugs on said collar, and means for circulating oil between said collar and said washer.

2. A thrust bearing comprising the combination with a shaft, of a thrust collar rigid on said shaft, said collar having a convex side face, a washer mounted on said shaft and having a concave face fitted over the convex side face of said collar, said washer being locked against rotation, oil throwing lugs on said collar, means for trapping the oil thrown by said lugs, oil grooves in said collar adapted to cause a circulation of oil between said collar and said washer, and means resiliently holding said washer seated against said collar.

3. A thrust bearing comprising the combination with a shaft journaled in a main bearing, of a thrust collar formed integrally with said shaft, said collar having a convex side face, a washer mounted on said shaft and having a concave face fitted over the convex side face of said collar, a covering and supporting casing secured to said main bearing and enclosing said collar and said washer, means for locking said washer against rotation, means resiliently holding said washer seated against said collar, and means for causing a forced flow of oil between said collar and said washer.

4. A thrust bearing comprising the combination with a shaft journaled in a main bearing, of a thrust collar formed integrally with said shaft, said collar having a convex side face, a washer mounted on said shaft and having a concave face fitted over the convex side face of said collar, a covering and supporting casing secured to said main bearing and enclosing said collar and said washer, means for locking said washer against rotation, means resiliently holding said washer seated against said collar, oil throwing lugs on said collar, means for trapping the oil thrown by said lugs, and means for causing a forced circulation of oil between said collar and said washer.

5. A thrust bearing comprising the combination with a shaft, of a thrust collar rigid on said shaft and adapted to rotate therewith, said collar having convex side faces, washers mounted on said shaft on each side of said collar and having concave faces fitted over said convex faces of said collar, means for locking said washers against rotation and means for causing a forced circulation of oil between said collar and said washers.

6. A thrust bearing comprising the combination with a shaft, of a thrust collar rigid on said shaft and adapted to rotate therewith, said collar having convex side faces, washers mounted on said shaft on each side of said collar and having concave faces fitted over said convex faces of said collar, means for resiliently seating said washers against said collar, means for locking said washers against rotation, oil throwing lugs on said collar, means for trapping oil thrown by said lugs, and means for causing a forced circulation of oil between said collar and said washers.

7. A thrust bearing comprising the combination with a shaft journaled in a main bearing, of a thrust collar formed integrally with said shaft, said collar having convex side faces, washers mounted on said shaft on each side of said collar and having concave faces fitted over said convex faces of said collar, a covering and supporting casing secured to said main bearing and enclosing said collar and said washers, means for resiliently holding said washers seated against said collar, oil throwing lugs on said collar, means for trapping the oil thrown by said lugs, and means for causing a forced circulation of oil between said collar and said washer.

8. A thrust bearing comprising the combination with a shaft, of a thrust collar rigid on said shaft, said collar having a convex side face, a washer mounted on said shaft and having a concave face fitted over the convex side face of said collar, said washer having a limited movement in all directions, so as to permit it to find its seat.

9. A thrust bearing comprising the combination with a shaft, of a thrust collar rigid on said shaft, said collar having a convex side face, a washer mounted on said shaft and having a concave face fitted over the convex side face of said collar, said washer having a limited movement in all directions, means for throwing oil over said bearing, and an oil and dust proof casing enclosing said bearing.

In testimony whereof I have hereunto set my hand.

FRANK R. McGEE.